United States Patent Office.

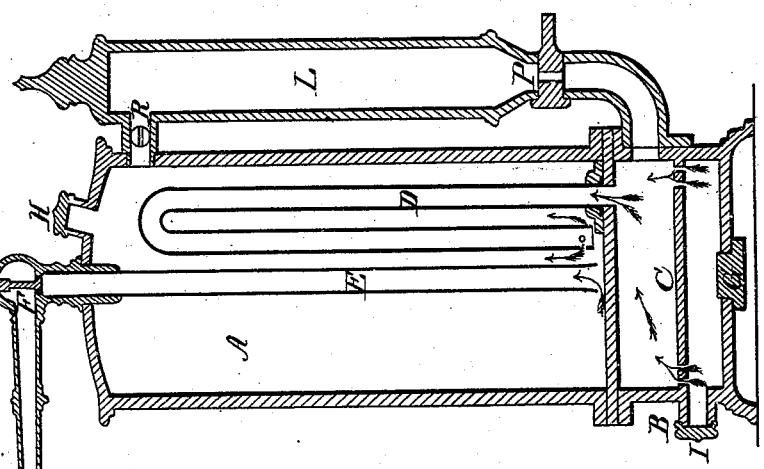
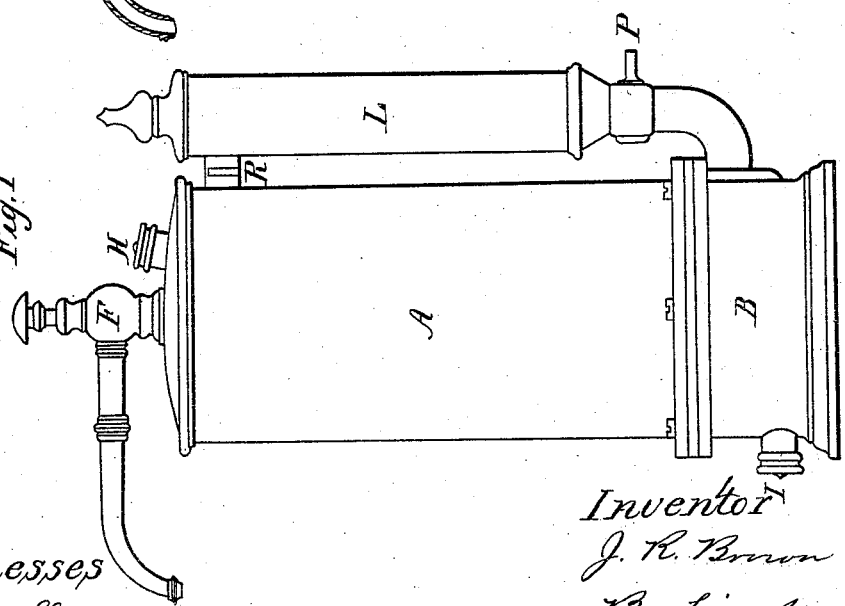

J. R. BROWN, OF NEW HAVEN, CONNECTICUT.

Letters Patent No. 93,802, dated August 17, 1869.

---

IMPROVEMENT IN SODA-WATER APPARATUS.

---

The Schedule referred to in these Letters Patent and making part of the same.

---

*To all whom it may concern:*

Be it known that I, J. R. BROWN, of New Haven, in the county of New Haven, and State of Connecticut, have invented a new Improvement in Soda-Water Apparatus; and I do hereby declare the following, when taken in connection with the accompanying drawings, and the letters of reference marked thereon, to be a full, clear, and exact description of the same, and which said drawings constitute part of this specification, and represent, in—

Figure 1, a side view, and in

Figure 2, a vertical central section.

The object of this invention is to construct a soda-water apparatus for family use, which shall combine within itself the water-vessel and the gas-generating apparatus, and the means of drawing from the water-vessel; and The invention consists in the arrangement of a water-vessel over a chamber, within which the gas is generated, by placing therein the requisite material, and so that the gas, when generated, will pass up into the water-vessel, impregnating the water, and creating a pressure thereon, so as to force the water from the vessel through the drawing-device.

To enable others to fully understand my invention, I will proceed to describe the same, as illustrated in the accompanying drawings.

A is the water-vessel.

B, the gas-generating chamber, here represented as divided by a perforated partition, C, the perforations being at the edge of the partition.

From the said chamber, a tube, D, leads up above the surface of the water, and down to near the bottom of the vessel, where it opens into the water.

E is the drawing-tube, which extends from near the bottom of the water-vessel up to a cock, F, which leads from the vessel.

G is a plug, in the bottom of the vessel, and H, the plug at the top.

To prepare the soda-water, the requisite quantity of water is poured into the vessel A, through the plug H, say up to the water-line, as denoted in red, fig. 2, then the vessel is inverted, the plug G removed, and a sufficient quantity of water poured into the chamber B, for generating the gas which runs through the perforations in the partition C.

Then tartaric acid and supercarbonate of soda are placed through the opening, on to the partition C, the plug G closed, and the apparatus again set upright.

The water, which has passed through the partition C returns, and, mingling with the acid and soda, generates the carbonic-acid gas which passes up, as denoted by the arrows, through the perforations in the partition C, up through the tube D, and down, passing out near the bottom of the water-vessel, then up through the water, impregnating the water, and filling the vessel above the water, so as to create a pressure thereon.

The apparatus is then ready for use, and the water is drawn by opening the cock F, the pressure of the gas forcing the water up through the tube E, and out through the cock.

Thus, I construct a cheap apparatus, and one so simple that a person with the least knowledge of such apparatus may use it.

If, instead of inverting the apparatus, it be desired, a plug, I, may be arranged, opening into the lower part of the chamber B, for the purpose of placing the acids therein, while the apparatus is in an upright position, and communicating with the upper part of the chamber, I arrange a water-supply, L, opening into the chamber, above the partition, by means of a cock, P, the supply being filled by opening the top, or in any other manner. Therefore, to generate gas by this construction, place the acid and soda into the chamber, through the plug I, then turn the cock P, and permit a sufficient quantity of water to run on to the partition C, then close the cock P, and gas is generated as before.

An equalizing-cock, R, should be arranged to permit the free flow of water from the supply L.

Having fully described my invention,

What I claim as new and useful, and desire to secure by Letters Patent, is—

1. The combination of the water-vessel A, gas-generating chamber B, tubes D and E, constructed, arranged, and operating substantially as set forth.

2. In combination with the above, the arrangement of the supply L, in the manner substantially as set forth.

J. R. BROWN.

Witnesses:
A. J. TIBBITS,
J. H. SHUMWAY.